(12) United States Patent
Inoue (10) Patent No.: US 9,742,956 B2
(45) Date of Patent: Aug. 22, 2017

(54) PRINTING APPARATUS HAVING DIRECT WIRELESS COMMUNICATION FUNCTION, CONTROL METHOD FOR PRINTING APPARATUS, AND STORAGE MEDIUM

(71) Applicant: CANON KABUSHIKI KAISHA, Tokyo (JP)

(72) Inventor: Go Inoue, Abiko (JP)

(73) Assignee: Canon Kabushiki Kaisha, Tokyo (JP)

(*) Notice: Subject to any disclaimer, the term of this patent is extended or adjusted under 35 U.S.C. 154(b) by 0 days.

(21) Appl. No.: 14/806,382

(22) Filed: Jul. 22, 2015

(65) Prior Publication Data
US 2016/0028918 A1    Jan. 28, 2016

(30) Foreign Application Priority Data
Jul. 24, 2014    (JP) .................... 2014-151203

(51) Int. Cl.
*G06F 3/12* (2006.01)
*H04N 1/327* (2006.01)
*H04N 1/00* (2006.01)
*G06K 15/00* (2006.01)

(52) U.S. Cl.
CPC ....... *H04N 1/32756* (2013.01); *G06F 3/1203* (2013.01); *G06F 3/1236* (2013.01); *G06F 3/1286* (2013.01); *G06F 3/1292* (2013.01); *H04N 1/0048* (2013.01); *H04N 1/00411* (2013.01); *H04N 1/00472* (2013.01); *H04N 1/32713* (2013.01); *H04N 1/32734* (2013.01)

(58) Field of Classification Search
None
See application file for complete search history.

(56) References Cited

U.S. PATENT DOCUMENTS

| 9,069,514 B2* | 6/2015 | Sakurai ................. G06F 3/1211 |
| 9,106,781 B2* | 8/2015 | Suzuki ................ H04N 1/00912 |
| 2014/0085666 A1* | 3/2014 | Park ..................... H04W 4/008 |
| | | 358/1.15 |

FOREIGN PATENT DOCUMENTS

| JP | 2002-312140 A | 10/2002 |
| JP | 2013-205982 A | 10/2012 |

* cited by examiner

*Primary Examiner* — Dov Popovici
(74) *Attorney, Agent, or Firm* — Canon USA Inc., IP Division (57) ABSTRACT

A printing apparatus is provided such that when a print processing apparatus is connected to the printing apparatus, use of Wi-Fi Direct is prohibited. On the other hand, in the printing apparatus, when the print processing apparatus is not connected to the printing apparatus, the use of Wi-Fi Direct is permitted.

11 Claims, 6 Drawing Sheets

MENU SCREEN 300

FIG. 3B

CONNECTION SCREEN 310

FIG. 3C

CONNECTION SCREEN 320

FIG. 3D

CONNECTION SCREEN 330

FIG. 4A

CONNECTION SCREEN 400

FIG. 4B

CONNECTION SCREEN 410

PRINTING APPARATUS HAVING DIRECT WIRELESS COMMUNICATION FUNCTION, CONTROL METHOD FOR PRINTING APPARATUS, AND STORAGE MEDIUM

BACKGROUND OF THE INVENTION

Field of the Invention

The present invention relates to a printing apparatus having a direct wireless communication function, a control method for a printing apparatus, and a storage medium.

Description of the Related Art

Among printing apparatuses such as multifunction peripherals, printers and the like, an increasing number of printing apparatuses now have wireless LAN functions. The printing apparatus having a wireless LAN function receives print data from an external apparatus such as a personal computer (PC), a mobile terminal or the like via an access point, and executes print processing based on the received print data.

Further, there exists, among the printing apparatuses, a printing apparatus which performs direct wireless communication with an external apparatus without going through an access point. Japanese Patent Application Laid-Open No. 2013-205982 discusses a printing apparatus that performs, with a mobile terminal, direct wireless communication using Wi-Fi Direct or Bluetooth (registered trademark).

Meanwhile, as a mode of using a printing apparatus, there is known a configuration in which a print processing apparatus is connected to a printing apparatus, as discussed in Japanese Patent Application Laid-Open No. 2002-312140. The print processing apparatus can interpret a page description language not supported by the printing apparatus itself. Print data interpreted by the print processing apparatus is converted into a form supported by the printing apparatus and then transmitted to the printing apparatus. Therefore, the printing apparatus can receive from the print processing apparatus print data in an interpretable form even if the print data is originally described in a page description language not supported by the printing apparatus.

Assume that, in the configuration in which the print processing apparatus is connected to the printing apparatus, a mobile terminal executes direct wireless communication with the printing apparatus without going through the print processing apparatus, and thereby transmits print data to the printing apparatus. This print data is transmitted to the printing apparatus without going through the print processing apparatus. Therefore, the printing apparatus may receive the print data described in a page description language not supported by the printing apparatus.

SUMMARY OF THE INVENTION

The present invention is directed to reduce inconvenience that occurs when a printing apparatus receives print data described in a page description language not supported by the printing apparatus, in a configuration in which a print processing apparatus is connected to the printing apparatus.

According to an aspect of the present invention, a printing apparatus has a direct wireless communication function of executing direct wireless communication between the printing apparatus and an external apparatus without going through an access point, and the printing apparatus includes a printing unit configured to execute print processing, a determination unit configured to determine whether a print processing apparatus that processes print data is connected to the printing apparatus, and a control unit configured to prohibit a user from using the direct wireless communication function, in a case where the determination unit determines that the print processing apparatus is connected to the printing apparatus.

According to another aspect of the present invention, a printing apparatus includes a wireless communication unit configured to execute wireless communication between the printing apparatus and an external apparatus, a printing unit configured to execute print processing based on print data, a determination unit configured to determine whether a print processing apparatus that processes print data is connected to the printing apparatus, and a control unit configured to prohibit the printing apparatus from executing the wireless communication with the external apparatus performed without going through the print processing apparatus, in a case where the determination unit determines that the print processing apparatus is connected to the printing apparatus.

According to yet another aspect of the present invention, a printing apparatus includes a wireless communication unit configured to execute wireless communication between the printing apparatus and an external apparatus, a printing unit configured to execute print processing based on print data, a connection unit configured to connect a print processing apparatus that processes print data to the printing apparatus, and a transfer unit configured to transfer print data, which is received by using the wireless communication without going through the print processing apparatus, to the print processing apparatus.

Further features of the present invention will become apparent from the following description of exemplary embodiments with reference to the attached drawings.

DESCRIPTION OF THE EMBODIMENTS

Exemplary embodiments of the present invention will be described below, with reference to the attached drawings. The following exemplary embodiments are not intended to limit the invention according to the scope of claims, and any combination of features described in the exemplary embodiments is not necessarily essential to a solution of the invention.

Figure 1A:
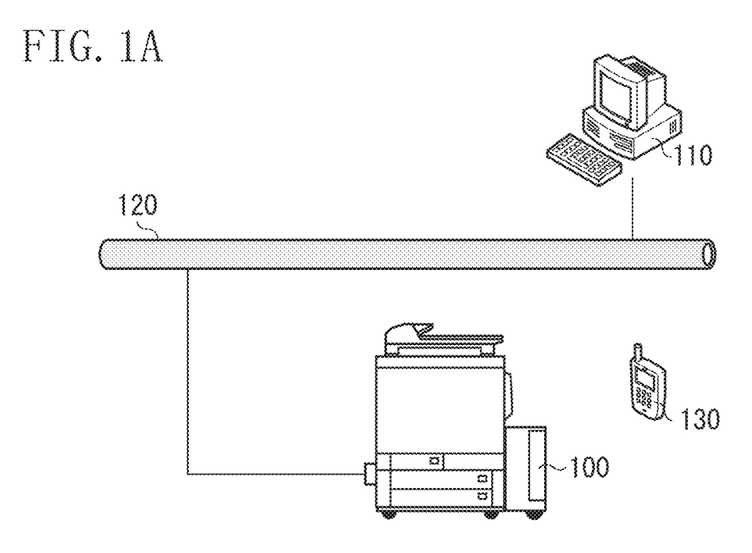
FIGS. 1A and 1B are diagrams each illustrating a configuration of a print system.
Figure 1B:
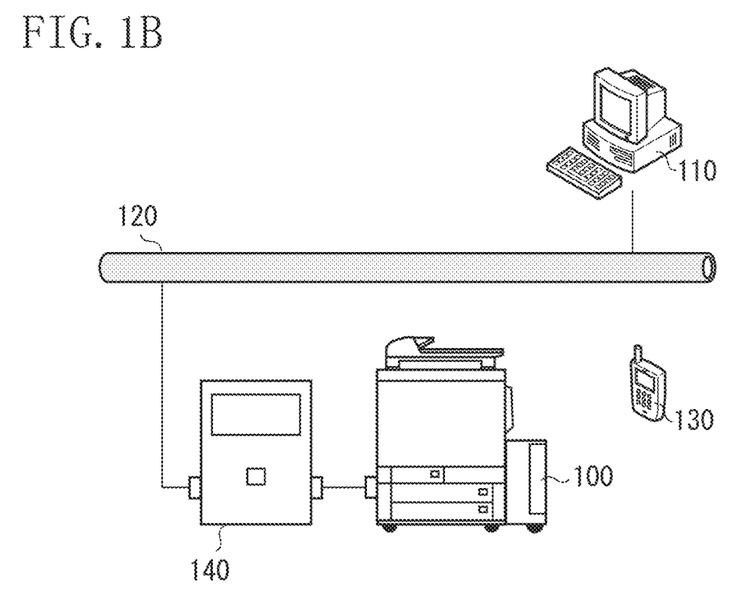

First, configurations of a print system according to a first exemplary embodiment of the present invention will be described using FIGS. 1A and 1B. FIG. 1A illustrates a configuration of using a printing apparatus 100 alone. FIG. 1B illustrates a configuration of using the printing apparatus 100 with a print processing apparatus 140 being connected to the printing apparatus 100.

First, a configuration in which the printing apparatus 100 is used alone will be described using FIG. 1A. The printing apparatus 100 is connected to a network 120, and can communicate with an external apparatus such as a personal computer (PC) 110 or the like via the network 120. The PC 110 transmits print data to the printing apparatus 100 via the network 120. The printing apparatus 100 receives the print data transmitted by the PC 110, interprets the received print data, and then executes print processing.

The printing apparatus 100 has a direct wireless communication function which enables the printing apparatus 100 to execute direct wireless communication with the external apparatus without going through a relaying equipment such as an access point. Wi-Fi Direct and Bluetooth (registered trademark) are conceivable specific examples of this wireless communication. The printing apparatus 100 will be described below as an apparatus that executes Wi-Fi Direct. Wi-Fi Direct is used in the description only as an example, and the wireless communication to which the present exemplary embodiment is applicable is not limited to Wi-Fi Direct.

The printing apparatus 100 can execute the direct wireless communication with a mobile terminal 130, by using Wi-Fi Direct. The mobile terminal 130 can transmit print data to the printing apparatus 100 via Wi-Fi Direct. The printing apparatus 100, which has received the print data transmitted via Wi-Fi Direct, interprets the received print data, and then executes the print processing.

Next, a configuration in which the printing apparatus 100 is used with the print processing apparatus 140 being connected to the printing apparatus 100 will be described using FIG. 1B. The printing apparatus 100 and the print processing apparatus 140 are connected to each other by a local area network (LAN) cable. The print processing apparatus 140, which has received print data transmitted from an external apparatus such as the PC 110 or the like, interprets this print data. The print processing apparatus 140 converts the interpreted print data into a form supported by the printing apparatus 100, and then transmits the converted print data to the printing apparatus 100. The printing apparatus 100 receives the print data transmitted from the print processing apparatus 140 and then executes the print processing based on the received print data.

The print processing apparatus 140 can interpret print data described in a page description language not supported by the printing apparatus 100. The print processing apparatus 140 converts the interpreted print data into a form supported by the printing apparatus 100, and then transmits the converted print data to the printing apparatus 100. Therefore, the printing apparatus 100 can receive, from the print processing apparatus 140, print data in an interpretable form even if the print data is originally described in a page description language not supported by the printing apparatus 100.

Assume that wireless communication using Wi-Fi Direct is executed between the printing apparatus 100 and the mobile terminal 130 in the configuration in which the printing apparatus 100 is used with the print processing apparatus 140 being connected to the printing apparatus 100, as illustrated in FIG. 1B. When wireless communication using Wi-Fi Direct is executed, the mobile terminal 130 can transmit print data to the printing apparatus 100 without going through the print processing apparatus 140. The printing apparatus 100 thereby receives from the mobile terminal 130 the print data not passed through the print processing apparatus 140, which leads to a situation in which the printing apparatus 100 becomes increasingly likely to receive the print data described in a page description language not supported by the printing apparatus 100.

Therefore, in the first exemplary embodiment, when the printing apparatus 100 is used with the print processing apparatus 140 being connected to the printing apparatus 100, execution of the direct wireless communication such as the one using Wi-Fi Direct with an external apparatus is prohibited. In other words, a user is prohibited from using the direct wireless communication function. Therefore, the mobile terminal 130 transmits print data via the print processing apparatus 140, so that the printing apparatus 100 can be less likely to receive print data described in a page description language not supported by the printing apparatus 100.

Figure 2A:
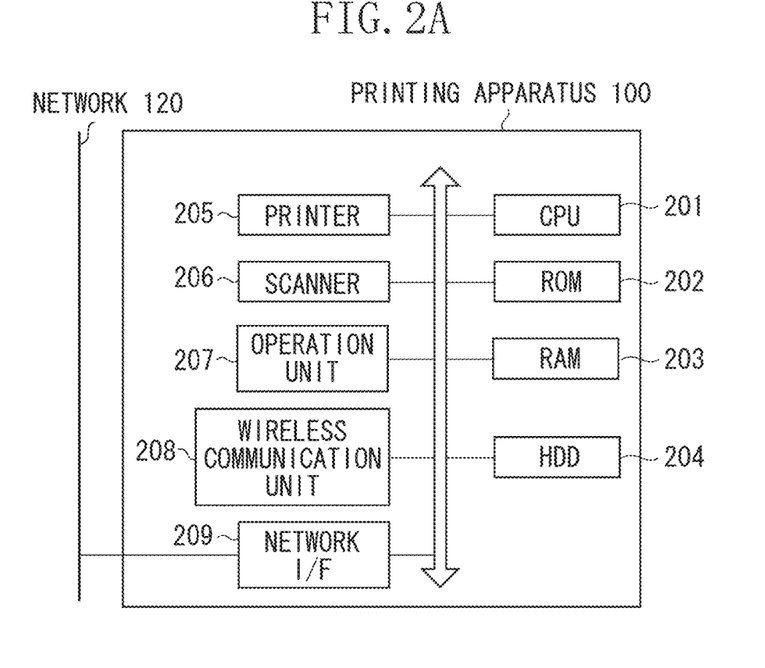
FIGS. 2A and 2B are diagrams each illustrating a configuration of a printing apparatus.

Next, a configuration of the printing apparatus 100 will be described using FIG. 2A. The printing apparatus 100 of the first exemplary embodiment is assumed to be a multifunction peripheral, but may be a printer not having a scanning function.

A central processing unit (CPU) 201 reads a control program stored in a read only memory (ROM) 202, and executes various types of processing for controlling operations of the printing apparatus 100, based on the read control program. The ROM 202 stores the control program. A random access memory (RAM) 203 is used as an area for temporarily storing a main memory, a work area or the like of the CPU 201. A hard disk device (HDD) 204 stores various types of data such as print data, scanned images or the like.

In the printing apparatus 100, the CPU 201, i.e., a single CPU, is assumed to execute each process in each flowchart described below. However, other mode is adoptable. For example, one or more CPUs may execute each process in each flowchart described below, by working together.

A printer 205 executes the print processing on a sheet, based on print data received from an external apparatus, a scanned image generated by a scanner 206, or the like. The scanner 206 reads a document and generates a scanned image (read image data). The scanned image generated by the scanner 206 is printed by the printer 205 and/or stored in the HDD 204.

An operation unit 207 includes a liquid crystal display section having a touch panel function, and a keyboard, and displays various screens described below. The user can input instructions and information into the printing apparatus 100 via the operation unit 207.

A wireless communication unit 208 executes the wireless communication with an external apparatus such as the mobile terminal 130 or the like, based on Wi-Fi Direct.

Figure 2B:
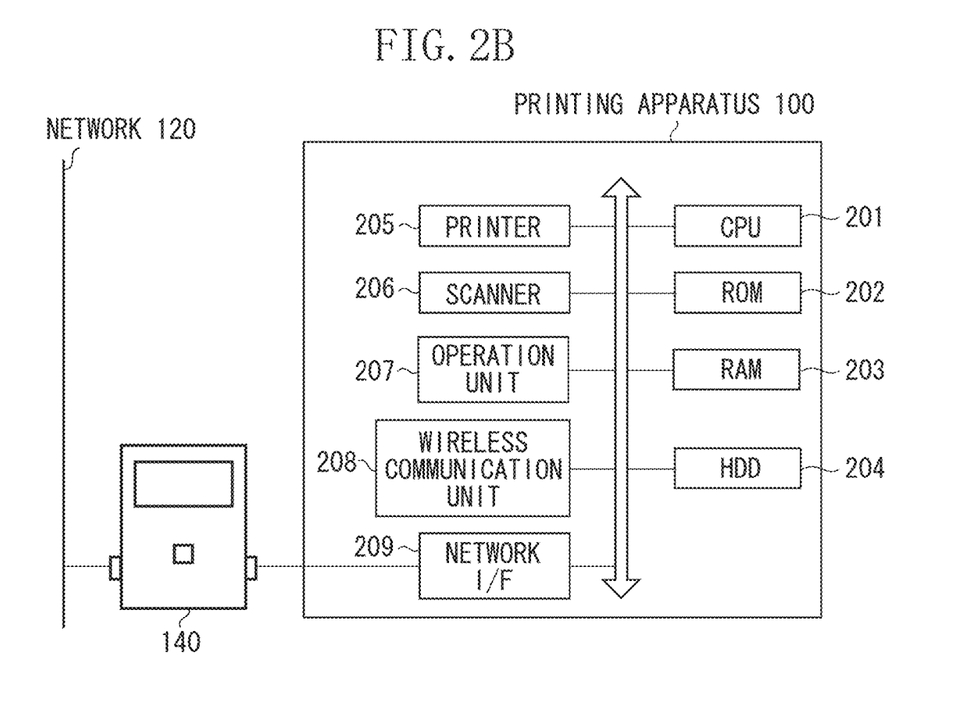

A network interface (I/F) 209 connects to the network 120, to execute communication with an external apparatus. FIG. 2A illustrates the configuration in which the printing apparatus 100 is used alone without being connected to the print processing apparatus 140. When the printing apparatus 100 is used with the print processing apparatus 140 being connected thereto, the printing apparatus 100 and the print processing apparatus 140 are connected by the LAN cable as illustrated in FIG. 2B.

Figure 3A:
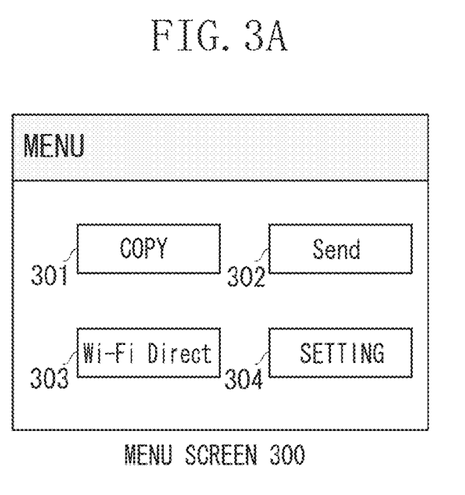
FIGS. 3A, 3B, 3C, and 3D are diagrams each illustrating an operation screen displayed by an operation unit.

Next, an operation procedure to be followed when the user uses Wi-Fi Direct, and operation screens to be displayed by the operation unit 207 will be described using FIGS. 3A, 3B, 3C, and 3D. FIG. 3A illustrates a menu screen 300 displayed by the operation unit 207. The menu screen 300 displays various selectable functions that can be used by the user. When the user selects (touches in a case of a touch panel) a button 301, the operation unit 207 displays a copy screen (not illustrated) for enabling the user to use a copy function. When the user selects a button 302, the operation unit 207 displays a Send screen (not illustrated) for enabling the user to use a Send function. When the user selects a button 304, the operation unit 207 displays a setting screen (not illustrated) for enabling the user to perform various types of settings such as paper setting, network setting or the like.

To use Wi-Fi Direct, the user selects a button 303 in the menu screen 300. When the user selects the button 303, the operation unit 207 displays a connection screen 310 illustrated in FIG. 3B. The connection screen 310 displays a connection start button 311 provided to enable the user to start connection processing for wireless communication based on Wi-Fi Direct.

Figure 3B:
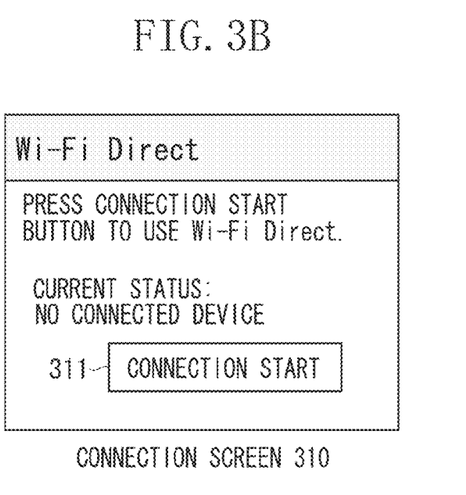
Figure 3C:
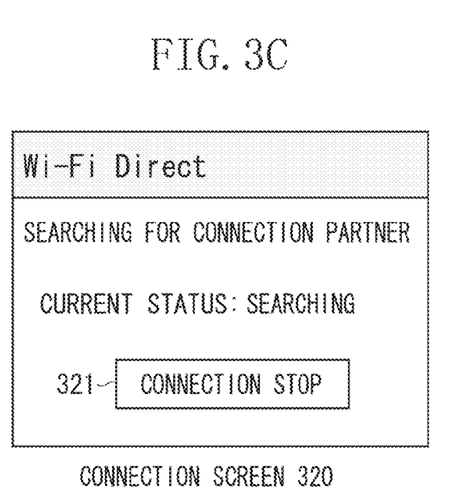
Figure 3D:
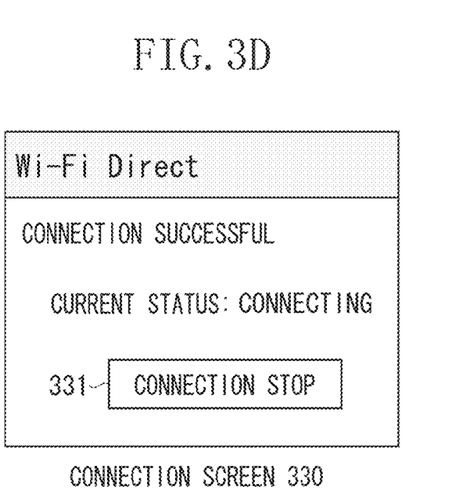

When the user selects the connection start button 311 in the connection screen 310, the operation unit 207 displays a connection screen 320 illustrated in FIG. 3C. The wireless communication unit 208 then starts the connection processing for the wireless communication based on Wi-Fi Direct. More specifically, the wireless communication unit 208 searches for a connection partner. In the first exemplary embodiment, the mobile terminal 130 similarly starts connection processing for wireless communication based on Wi-Fi Direct in response to user operation serving as a trigger, so that the wireless communication unit 208 identifies the mobile terminal 130 as the connection partner. A button 321 is provided to be selected by the user to stop use of Wi-Fi Direct.

When the wireless communication unit 208 identifies the mobile terminal 130 as a connection partner, wireless communication based on Wi-Fi Direct is established between the wireless communication unit 208 and the mobile terminal 130. Thus, the printing apparatus 100 and the mobile terminal 130 can execute direct wireless communication without going through a relaying equipment such as an access point or the like, so that the mobile terminal 130 can directly transmit print data to the printing apparatus 100. When the wireless communication based on Wi-Fi Direct is established between the printing apparatus 100 and the mobile terminal 130, the operation unit 207 displays a connection screen 330 illustrated in FIG. 3D.

The operation procedure when Wi-Fi Direct is used has been described above using FIGS. 3A, 3B, 3C, and 3D. Meanwhile, the use of Wi-Fi Direct is prohibited when the printing apparatus 100 is used with the print processing apparatus 140 being connected thereto, as illustrated in FIG. 1B. How the use of Wi-Fi Direct is prohibited will be described using FIGS. 4A and 4B.

Figure 4A:
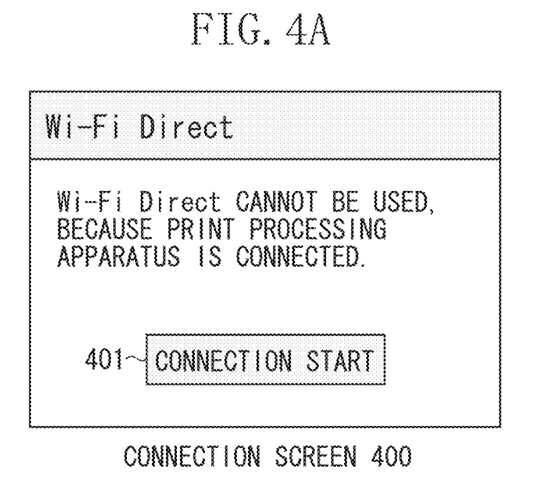
FIGS. 4A and 4B are diagrams each illustrating an operation screen displayed by the operation unit.
Figure 4B:
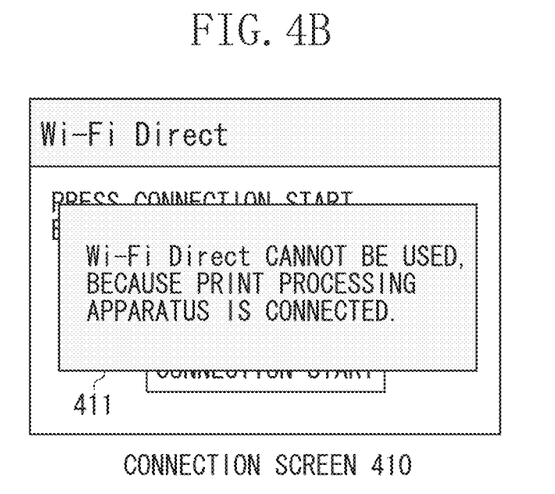

When the user selects the button 303 in the menu screen 300 in the configuration in which the print processing apparatus 140 is connected to the printing apparatus 100, the operation unit 207 displays a connection screen 400 illustrated in FIG. 4A. Unlike the connection screen 310 in FIG. 3B, the connection screen 400 is displayed in a disabled state in which selection of a connection start button 401 by the user is not accepted. The connection start button 401 in the connection screen 400 is grayed out to indicate the disabled state. The connection start button 401 gives no reaction even if the user selects the connection start button 401. The use of Wi-Fi Direct is prohibited in this way.

The way of prohibiting the use of Wi-Fi Direct is not limited to the way described above with reference to the connection screen 400, and other way may be adopted. For example, a message 411 illustrated in a connection screen 410 in FIG. 4B may be displayed in response to a press of the connection start button 311 in the connection screen 310. Alternatively, the use of Wi-Fi Direct by the user may be prohibited, by performing control so that the button 303 is not selectable by the user (e.g., by displaying the button 303 in a grayed-out state) in the menu screen 300.

In the above description, the use of Wi-Fi Direct is prohibited when the print processing apparatus 140 is connected to the printing apparatus 100. However, printing through use of the mobile terminal 130 is not completely disabled. Printing through the use of the mobile terminal 130 can be executed, when the mobile terminal 130 transmits print data to the print processing apparatus 140 via Wi-Fi without using Wi-Fi Direct.

As described above, the direct wireless communication between the printing apparatus 100 and the mobile terminal 130 is prohibited, on condition that the print processing apparatus 140 is connected to the printing apparatus 100. Therefore, the printing apparatus 100 can be less likely to receive print data described in a page description language not supported by the printing apparatus 100, in the configuration in which the print processing apparatus 140 is connected to the printing apparatus 100.

Figure 5:
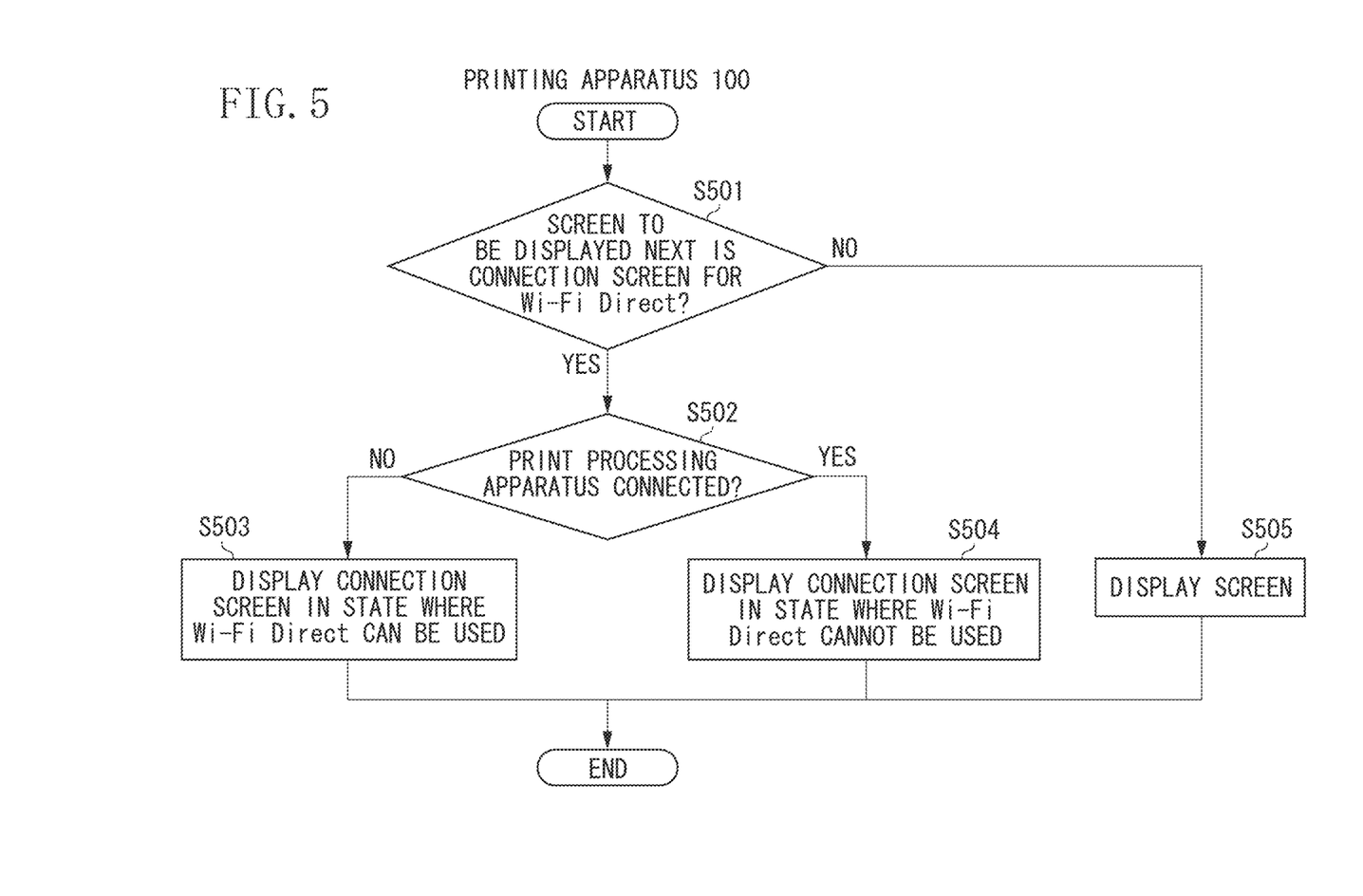
FIG. 5 is a flowchart illustrating processing to be executed by the printing apparatus.

Next, processing to be executed when a screen transition occurs will be described using a flowchart of FIG. 5. The CPU 201 reads a control program stored in a memory such as the ROM 202 or the like, and loads the read control program in the RAM 203 for its execution to thereby perform each step in the flowchart of FIG. 5.

When a screen transition caused by a user operation occurs, then in step S501, the CPU 201 determines whether a screen to be displayed next is a connection screen for Wi-Fi Direct to appear for use of Wi-Fi Direct by the user. When the CPU 201 determines that the screen to be displayed next is not the connection screen for Wi-Fi Direct (No in step S501), the processing proceeds to step S505. In step S505, the CPU 201 controls the operation unit 207 so that the operation unit 207 displays a screen according to the screen transition. The operation unit 207 thus displays the screen according to the screen transition. On the other hand, when the CPU 201 determines that the screen to be displayed next is the connection screen for Wi-Fi Direct (Yes in step S501), the processing proceeds to step S502.

In step S502, the CPU 201 determines whether the print processing apparatus 140 is connected. In the first exemplary embodiment, in a case where the print processing apparatus 140 is connected to the printing apparatus 100, identification information of the print processing apparatus 140 is stored in a storage area such as the HDD 204 or the like. In step S502, the CPU 201 checks presence/absence of this identification information of the print processing apparatus 140 to thereby determine whether the print processing apparatus 140 is connected to the printing apparatus 100. The way of determining whether the print processing apparatus 140 is connected to the printing apparatus 100 is not limited to the way described with reference to step S502, and other way may be adopted. For example, an inquiry packet inquiring whether the print processing apparatus 140 is connected to the printing apparatus 100 may be transmitted via the network I/F 209, and whether the print processing apparatus 140 is connected may be determined based on presence/absence of a response to the inquiry packet.

When the CPU 201 determines that the print processing apparatus 140 is not connected to the printing apparatus 100 (No in step S502), the processing proceeds to step S503. In step S503, the CPU 201 controls the operation unit 207, so that the operation unit 207 displays the connection screen for Wi-Fi Direct, in a state where Wi-Fi Direct can be selected for use. For example, the operation unit 207 displays the connection screen in a state where a connection start button for enabling a user to use Wi-Fi Direct is selectable, as with the connection screen 310 illustrated in FIG. 3B. In other words, when the print processing apparatus 140 is not connected to the printing apparatus 100, the user is permitted to use Wi-Fi Direct.

On the other hand, when the CPU 201 determines that the print processing apparatus 140 is connected to the printing apparatus 100 (Yes in step S502), the processing proceeds to step S504. In step S504, the CPU 201 controls the operation unit 207, so that the operation unit 207 displays the connection screen for Wi-Fi Direct, in a state where Wi-Fi Direct cannot be selected for use. For example, the operation unit 207 displays the connection screen in a state where the user cannot select a connection start button for using Wi-Fi Direct, as with the connection screen 400 in FIG. 4A. Alternatively, a message saying that Wi-Fi Direct cannot be used may be displayed when a connection start button is selected by the user, as described with reference to the connection screen 410 illustrated in FIG. 4B. Thus, the user is prohibited from using Wi-Fi Direct when the print processing apparatus 140 is connected to the printing apparatus 100.

As described above, according to the first exemplary embodiment, it is determined whether to prohibit the user from using the wireless communication such as the one using Wi-Fi Direct, depending on whether the print processing apparatus 140 is connected to the printing apparatus 100.

When the print processing apparatus 140 is not connected to the printing apparatus 100, the user is permitted to use the wireless communication such as the one using Wi-Fi Direct. In other words, the printing apparatus 100 is permitted to receive print data by using the wireless communication such as the one using Wi-Fi Direct, on condition that the print processing apparatus 140 is not connected to the printing apparatus 100.

On the other hand, the user is prohibited from using the wireless communication such as Wi-Fi Direct, when the print processing apparatus 140 is connected to the printing apparatus 100. In other words, the printing apparatus 100 is prohibited from receiving print data by using the wireless communication such as Wi-Fi Direct, on condition that the print processing apparatus 140 is connected to the printing apparatus 100.

When the print processing apparatus 140 is connected to the printing apparatus 100, the printing apparatus 100 can prevent the user from directly transmitting, using the wireless communication such as the one using Wi-Fi Direct, print data to the printing apparatus 100. Therefore, the printing apparatus 100 can be less likely to receive print data described in a page description language not supported by the printing apparatus 100.

A second exemplary embodiment of the present invention will be described. A print system and a printing apparatus 100 of the second exemplary embodiment have configurations similar to the configurations described with reference to FIGS. 1A and 1B as well as FIGS. 2A and 2B.

In the second exemplary embodiment, unlike the first exemplary embodiment, a user is permitted to use Wi-Fi Direct both in a case where a print processing apparatus 140 is connected to the printing apparatus 100 and a case where the print processing apparatus 140 is not connected to the printing apparatus 100. When receiving print data by performing wireless communication using Wi-Fi Direct, the printing apparatus 100 transfers the received print data to the print processing apparatus 140. Thus, even if a mobile terminal 130 directly transmits, via wireless communication using Wi-Fi Direct, print data which is described in a page description language not supported by the printing apparatus 100, the printing apparatus 100 can have the print data processed by the print processing apparatus 140. Therefore, the printing apparatus 100 can be less likely to receive print data described in a page description language not supported by the printing apparatus 100, in a configuration in which the print processing apparatus 140 is connected to the printing apparatus 100.

Figure 6:
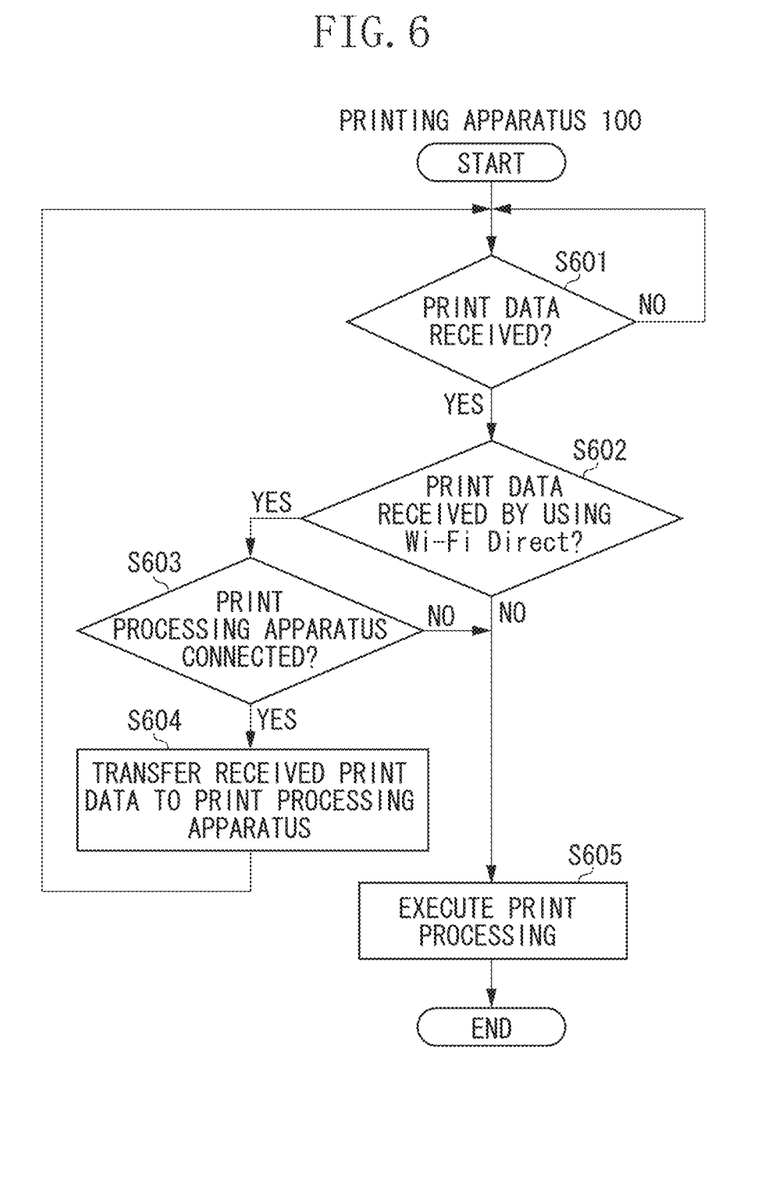
FIG. 6 is a flowchart illustrating processing to be executed by the printing apparatus.

Next, processing to be executed by the printing apparatus 100 of the second exemplary embodiment will be described using a flowchart of FIG. 6. A CPU 201 reads a control program stored in a memory such as a ROM 202 or the like, and loads the read control program in a RAM 203 for execution to thereby perform each step in the flowchart of FIG. 6.

In step S601, the CPU 201 determines whether print data is received. In a case where the CPU 201 determines that print data is received (Yes in step S601), the processing proceeds to step S602. On the other hand, if no print data is received (No in step S601), the CPU 201 waits until receipt of print data.

Next, in step S602, the CPU 201 determines whether the print data is received by using Wi-Fi Direct. In a case where the print data is received by a wireless communication unit 208 by using Wi-Fi Direct, the CPU 201 determines that the print data is received by using Wi-Fi Direct (Yes in step S602), and the processing proceeds to step S603. On the other hand, in a case where the print data is received by a network I/F 209, the CPU 201 determines that the print data is not received by using Wi-Fi Direct (No in step S602), and the processing proceeds to step S605. In step S605, the CPU 201 controls a printer 205 so that the printer 205 executes print processing based on the print data. The printer 205 thus executes the print processing.

Processing performed in Step S603 will be described. In step S603, the CPU 201 determines whether the print processing apparatus 140 is connected to the printing apparatus 100. This determination is a process similar to the process in step S502 described with reference to FIG. 5, so the explanation thereof will not be given here.

When the CPU 201 determines that the print processing apparatus 140 is not connected to the printing apparatus 100 (No in step S603), the processing proceeds to step S605. In step S605, the CPU 201 controls the printer 205 so that the printer 205 executes the print processing based on the print data. If the received print data is described in a page description language not supported by the printing apparatus 100, the process in step S605 is terminated with an error.

On the other hand, when the CPU 201 determines that the print processing apparatus 140 is connected to the printing apparatus 100 (Yes in step S603), the processing proceeds to step S604. In step S604, the CPU 201 controls the network I/F 209 so that the network I/F 209 transfers the received print data to the print processing apparatus 140. The network I/F 209 thus transfers the print data to the print processing apparatus 140. The print processing apparatus 140, to which the print data has been transferred, processes the transferred print data. More specifically, the print processing apparatus 140 converts the print data into a form supported by the printing apparatus 100, and then transmits the converted print data to the printing apparatus 100. Here, the transmitted print data is received by the network I/F 209, and therefore, it is determined that the print data is not received by using the wireless communication using Wi-Fi Direct (No in step S602), and then in step S605, the print processing is executed.

As described above, according to the second exemplary embodiment, when the print processing apparatus 140 is connected to the printing apparatus 100, the printing apparatus 100 transfers the print data received by using Wi-Fi Direct, to the print processing apparatus 140. The transferred print data is processed by the print processing apparatus 140, and then anew transmitted to the printing apparatus 100. Therefore, the printing apparatus 100 can be less likely to receive print data described in a page description language not supported by the printing apparatus 100, in the configuration in which the print processing apparatus 140 is connected to the printing apparatus 100.

In the configuration described in the first exemplary embodiment, execution of the wireless communication using Wi-Fi Direct is prohibited without exception, on condition that the print processing apparatus 140 is connected to the printing apparatus 100. However, in a case where the printing apparatus 100 transmits data (for example, a scanned image generated by the scanner 206) to the mobile terminal 130 via the wireless communication using Wi-Fi Direct, the data is not necessarily transmitted via the print processing apparatus 140. Therefore, in a third exemplary embodiment, when a print processing apparatus is connected to a printing apparatus 100, the printing apparatus 100 may be permitted to transmit data to a mobile terminal 130 via the wireless communication using Wi-Fi Direct, while being prohibited from receiving print data via the wireless communication using Wi-Fi Direct.

In each of the exemplary embodiments described above, the communication using Wi-Fi Direct is taken as an example of the wireless communication to be executed between the printing apparatus 100 and the mobile terminal 130 without going through the print processing apparatus 140. However, each of the exemplary embodiments described above is applicable to a case of using other type of wireless communication. For example, in a configuration in which the printing apparatus 100 is directly connected to an access point, wireless communication may be likewise executed between the printing apparatus 100 and the mobile terminal 130 without going through the print processing apparatus 140. Each of the exemplary embodiments described above is applicable to such a configuration.

The present invention is also achievable by such processing that a program implementing one or more functions of any of the above-described exemplary embodiments is supplied to a system or an apparatus via a network or a storage medium, and one or more processors in the system or the apparatus read the program and then execute the read program. Moreover, the present invention is also achievable by a circuit (e.g., an application-specific integrated circuit (ASIC)) that implements one or more functions.

According to the exemplary embodiments of the present invention, it is possible to reduce inconvenience that occurs when a printing apparatus receives print data described in a page description language not supported by the printing apparatus, in a configuration in which a print processing apparatus is connected to the printing apparatus.

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2014-151203, filed Jul. 24, 2014, which is hereby incorporated by reference herein in its entirety.

What is claimed is:

1. A printing apparatus comprising:
    a printer that executes print processing;
    a network interface;
    a wireless communicator that has a direct wireless communication function to make a direct wireless connection between the printing apparatus and an external apparatus without using a relaying apparatus;
    a memory storing instructions; and
    a processor that executes the instructions to:
    determine whether a print processing apparatus that processes print data for the printing apparatus is connected to the network interface;
    prohibit at least the wireless communicator from executing the direct wireless communication function, on condition that the print processing apparatus is determined to be connected to the network interface.

2. The printing apparatus according to claim 1, wherein, the processor permits the wireless communicator to execute the direct wireless communication function, on condition that the print processing apparatus is determined not to be connected to the network interface.

3. The printing apparatus according to claim 1, wherein the direct wireless communication function is Wi-Fi Direct.

4. The printing apparatus according to claim 1, wherein the relaying apparatus is an access point.

5. A method of controlling a printing apparatus having a network interface and a wireless communicator that has a direct wireless communication function to make a direct wireless connection between the printing apparatus and an external apparatus without using a relaying apparatus, the method comprising:
    determining whether a print processing apparatus that processes print data for the printing apparatus is connected to the network interface; and
    prohibiting at least the wireless communicator from executing the direct wireless communication function on condition that the print processing apparatus is determined to be connected to the network interface.

6. A non-transitory computer-readable storage medium storing instructions that, when executed by a processor, control a printing apparatus having a network interface and a wireless communicator that has a direct wireless communication function to make a direct wireless connection between the printing apparatus and an external apparatus without using a relaying apparatus, to execute a control method, the method comprising:
- determining whether a print processing apparatus that processes print data for the printing apparatus is connected to the network interface; and
- prohibiting at least the wireless communicator from executing the direct wireless communication function on condition that the print processing apparatus is determined to be connected to the network interface.

7. A printing apparatus comprising:
- a printer that executes print processing;
- a network interface;
- a wireless communicator that has a direct wireless communication function to make a direct wireless connection between the printing apparatus and an external apparatus without using a relaying apparatus;
- a display that displays a connection screen provided for a user to input an execution instruction for the direct wireless communication function to the printing apparatus;
- a memory storing instructions; and
- a processor that executes the instructions to:
- determine whether a print processing apparatus that processes print data for the printing apparatus is connected to the network interface; and
- control the display to display the connection screen in such a state that the user is not able to input the execution instruction to the printing apparatus, on condition that the print processing apparatus is determined to be connected to the network interface.

8. The printing apparatus according to claim 7, wherein the direct wireless communication function is Wi-Fi Direct.

9. The printing apparatus according to claim 7, wherein the relaying apparatus is an access point.

10. A method of controlling a printing apparatus having a printer that executes print processing, a network interface, a wireless communicator that has a direct wireless communication function to make a direct wireless connection between the printing apparatus and an external apparatus without using a relaying apparatus and a display that displays a connection screen provided for a user to input an execution instruction for the direct wireless communication function to the printing apparatus, the method comprising:
- determining whether a print processing apparatus that processes print data for the printing apparatus is connected to the network interface; and
- controlling the display to display the connection screen in such a state that the user is not able to input the execution instruction to the printing apparatus, on condition that the print processing apparatus is determined to be connected to the network interface.

11. A non-transitory computer-readable storage medium storing instructions that, when executed by a processor, control a printing apparatus having a printer that executes print processing, a network interface, a wireless communicator that has a direct wireless communication function to make a direct wireless connection between the printing apparatus and an external apparatus without using a relaying apparatus and a display that displays a connection screen provided for a user to input an execution instruction for the direct wireless communication function to the printing apparatus, to execute a control method, the method comprising:
- determining whether a print processing apparatus that processes print data for the printing apparatus is connected to the network interface; and
- controlling the display to display the connection screen in such a state that the user is not able to input the execution instruction to the printing apparatus, on condition that the print processing apparatus is determined to be connected to the network interface.

\* \* \* \* \*